United States Patent
Schedler

(10) Patent No.: US 7,594,678 B2
(45) Date of Patent: Sep. 29, 2009

(54) SIDE AIR-BAG WITH INTERNAL TETHER

(75) Inventor: Hubert Schedler, Karlsfeld (DE)

(73) Assignee: Autoliv Development AB, Vargarda (SE)

( * ) Notice: Subject to any disclaimer, the term of this patent is extended or adjusted under 35 U.S.C. 154(b) by 121 days.

(21) Appl. No.: 10/579,257

(22) PCT Filed: Nov. 3, 2004

(86) PCT No.: PCT/EP2004/012425

§ 371 (c)(1),
(2), (4) Date: Apr. 19, 2007

(87) PCT Pub. No.: WO2005/044644

PCT Pub. Date: May 19, 2005

(65) Prior Publication Data

US 2007/0267856 A1 Nov. 22, 2007

(30) Foreign Application Priority Data

Nov. 11, 2003 (GB) .................................. 0326258.1

(51) Int. Cl.
*B60R 21/18* (2006.01)
*B60R 21/207* (2006.01)
*B60R 21/24* (2006.01)

(52) U.S. Cl. ................. 280/743.2; 280/729; 280/730.2; 280/743.1

(58) Field of Classification Search ................. 280/729, 280/730.1, 730.2, 743.1, 743.2
See application file for complete search history.

(56) References Cited

U.S. PATENT DOCUMENTS

| | | | |
|---|---|---|---|
| 5,358,273 A | 10/1994 | Onishi et al. | |
| 5,478,114 A | 12/1995 | Maurer et al. | |
| 5,647,609 A * | 7/1997 | Spencer et al. | ........... 280/730.2 |
| 5,676,395 A * | 10/1997 | Oe et al. | ................... 280/730.2 |
| 5,730,464 A | 3/1998 | Hill | |
| 5,765,863 A | 6/1998 | Storey et al. | |
| 5,984,348 A | 11/1999 | Specht et al. | |
| 6,073,959 A * | 6/2000 | Heinz et al. | .................. 280/729 |
| 6,364,348 B1 * | 4/2002 | Jang et al. | ................. 280/730.2 |
| 6,422,593 B1 | 7/2002 | Ryan | |
| 6,471,244 B1 | 10/2002 | Nishijima et al. | |
| 2002/0146949 A1 | 10/2002 | Keshavaraj | |

FOREIGN PATENT DOCUMENTS

DE 44 30 221 C1 11/1995

(Continued)

*Primary Examiner*—Ruth Ilan
*Assistant Examiner*—James English
(74) *Attorney, Agent, or Firm*—Brinks Hofer Gilson & Lione

(57) ABSTRACT

A side air-bag formed from two layers of fabric includes an internal tether extending from a fold-line in a region of the air-bag configured to receive a gas generator to a point on one of the layers of fabric. The distance around the periphery of the air-bag between the ends of the tether is greater in one direction than in the other direction. The length of the tether is less than the shorter of the two distances. The tether serves to assist in guiding the air-bag, on inflation, so that it extends forwardly from a vehicle seat to lie adjacent an occupant of the vehicle seat.

15 Claims, 3 Drawing Sheets

FOREIGN PATENT DOCUMENTS

| | | | |
|---|---|---|---|
| DE | 195 29 829 C1 | 10/1996 |
| DE | 100 21 576 A1 | 11/2000 |
| DE | 102 11 232 A1 | 10/2003 |
| DE | 102 46 769 A1 | 4/2004 |
| EP | 0 940 302 A1 | 9/1999 |
| EP | 1 122 134 A1 | 8/2001 |
| EP | 1 193 136 A2 | 4/2002 |
| EP | 1 433 667 A2 | 6/2004 |
| GB | 2 357 467 A | 6/2001 |
| GB | 2 369 328 A | 5/2002 |
| JP | 05-238347 | 9/1993 |
| JP | 2000-85515 | 3/2000 |
| JP | 2001-114060 | 4/2001 |
| WO | WO 00/15472 | 3/2000 |
| WO | WO 03/008234 A2 | 1/2003 |
| WO | WO 2004/065179 A1 | 8/2004 |
| WO | WO 2004/094199 A1 | 11/2004 |
| WO | WO 2004/106122 A1 | 12/2004 |
| WO | WO 2005/000639 A1 | 1/2005 |

* cited by examiner

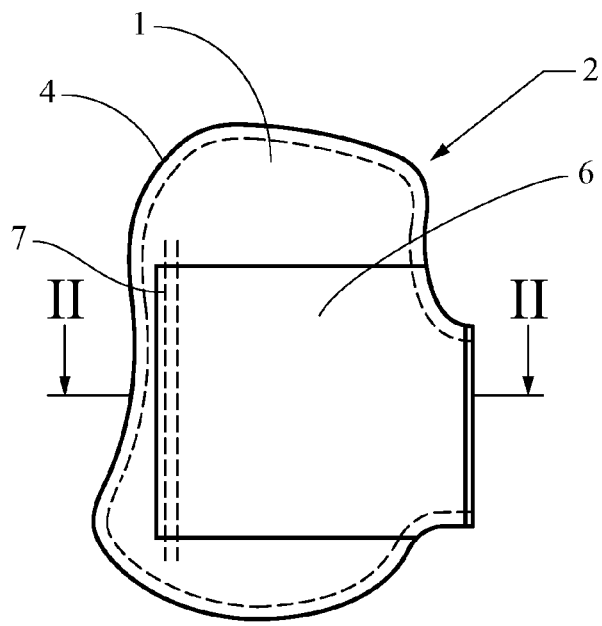
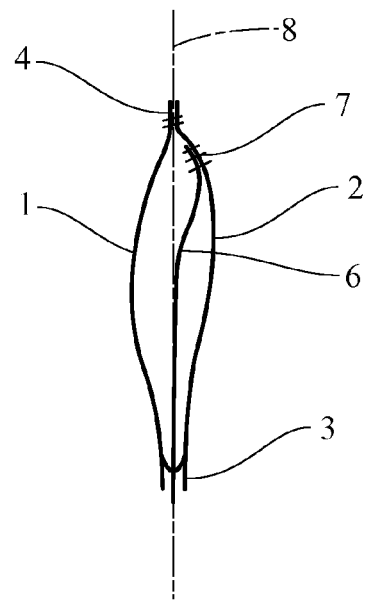
FIG. 1
FIG. 2
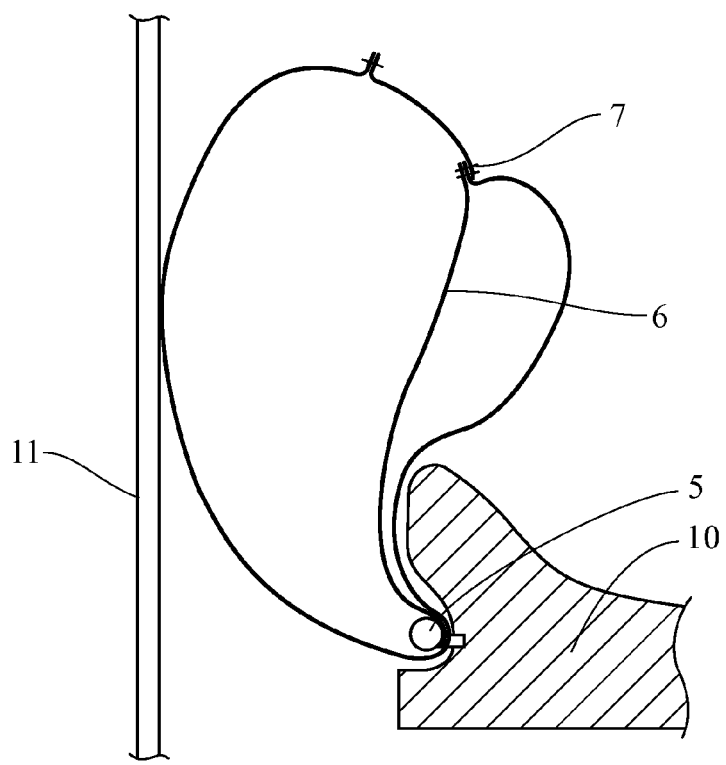
FIG. 3

SIDE AIR-BAG WITH INTERNAL TETHER

CROSS REFERENCE TO RELATED APPLICATIONS

This application claims priority to Great Britain patent application serial number 0326258, filed Nov. 11, 2003 and PCT/EP2004/012425, filed Nov. 3, 2004.

BACKGROUND

1. Field of the Invention

The present invention relates to an air-bag and more particularly relates to a side impact air-bag.

2. Description of Related Art

A side impact air-bag is an air-bag intended to be mounted in a motor vehicle in such a location that, when the air-bag is inflated, the air-bag is located at a position adjacent the side of an occupant of a seat. Typically such a side air-bag is mounted in the back-rest of the seat, although the air-bag may be mounted in a side-wall of the vehicle. Most commonly the side air-bag is positioned so that, when inflated, it lies between the occupant and an adjacent side part of the vehicle. The air-bag may thus act to prevent the seat occupant from impacting severely with the side of the vehicle and, in a side impact situation, may provide a degree of protection if the side of the vehicle is driven inwardly towards the seat occupant.

When a side air-bag is mounted in the back-rest of the seat, the air-bag is typically mounted in a recess or pocket which is provided in the side part of the back-rest. On inflation, therefore, the air-bag initially emerges in a generally side-ways direction from the back-rest of the seat, but then it has to move forwardly so that the main inflated part of the air-bag lies adjacent and to one side of the seat occupant.

Various proposals have been made as to the design of an air-bag to cause the air-bag to effect this initial side-ways and subsequent forward movement. The present invention seeks to provide an improved side air-bag.

SUMMARY

According to this invention there is provided a side air-bag, the side air-bag incorporating an internal tether, the internal tether serving to interconnect two spaced-apart regions of the. Wherein the distance around the periphery of the air-bag, in horizontal section, between the ends of the tether is greater in one direction than in the other direction, and the length of the tether is less than the shorter of the two distances.

Preferably the tether has an overall vertical extent of at least 50 mm.

Conveniently the side air-bag incorporates a region to receive a gas generator and an inflatable region extending therefrom, the tether extending from a point in or adjacent the said region to receive the gas generator to a point within the inflatable region which is remote from the gas generator.

In one embodiment the air-bag is formed from two super-imposed substantially identical layers of fabric, the layers of fabric being interconnected by a peripheral seam, the tether extending from the said region to receive a gas generator to, part of one of said layers of fabric spaced from said peripheral seam.

In another embodiment the air-bag is formed from two super-imposed layers of fabric interconnected by a peripheral seam, the internal tether extending from part of the peripheral seam to a point adjacent the region to receive the gas generator.

In a further embodiment the air-bag is formed from two super-imposed substantially identical layers of fabric interconnected by a peripheral seam, there being a gusset or third layer of fabric interposed between said two layers of fabric over at least part of the peripheral seam, the tether extending from the said region to receive an air-bag to a side edge part of said gusset.

In yet a further embodiment of the invention the air-bag is formed from two adjacent layers of fabric of different sizes interconnected by a peripheral seam, the internal tether extending from the said region to receive the gas generator to part of the peripheral seam.

Further objects, features and advantages of this invention will become readily apparent to persons skilled in the art after a review of the following description, with reference to the drawings and claims that are appended to and form a part of this specification.

DESCRIPTION OF THE DRAWINGS

In order that the invention may be more readily understood, and so that further features thereof may be appreciated, the invention will now be described, by way of example, with reference to the accompanying drawings in which:

FIG. 1 is a plan view of a side air-bag in accordance with the invention;

FIG. 2 is a horizontal sectional view taken on the line 11-11 of FIG. 1 showing the air-bag partly inflated;

FIG. 3 is a horizontal sectional view corresponding to FIG. 2 showing the air-bag of FIG. 1 when inflated, and when mounted to part of a vehicle seat;

DETAILED DESCRIPTION

Figure 4:
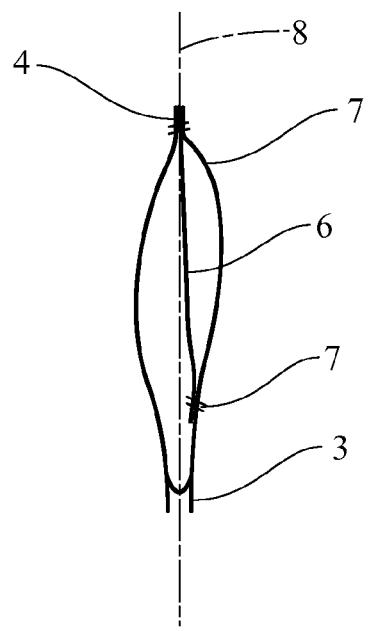
FIG. 4 is a horizontal sectional view corresponding to FIG. 2 but illustrating a second embodiment of the invention.

In the described embodiment of the present invention, a side air-bag is provided which is intended to be mounted on a seat although it is to be appreciated that other embodiments of the invention may be mounted on a part of the side of a motor vehicle. In each described embodiment of the air-bag, the air-bag is formed from two adjacent or super-imposed layers of fabric. The layers may be identical or, alternatively, may be of different sizes. The fabric layers are interconnected, for example, by means of a peripheral seam, although at least part of the peripheries of the layers being interconnected may have, between them, a third layer or "gusset" so as to provide a so-called "three-dimensional" air-bag.

In each embodiment of the invention an internal strap or tether is provided which interconnects, internally, two parts of the air-bag. The tether may be a single panel having a vertical extent of at least 50 mm or, alternatively, may comprise a plurality of straps which act together to replicate the action of the panel, with the distance between the lowermost edge of the lower strap and the uppermost edge of the upper strap exceeding 50 mm.

The tether is mounted to the air-bag in such a way that the distance around the periphery of the air-bag, when conceded in horizontal section, from one end of the tether to the other end of the tether is greater in one direction than the other direction. Also the overall length of the tether is less than the lesser of the two distances around the periphery of the air-bag. The tether serves to divide the interior of the air-bag into two chambers, one chamber having a greater volume than the other chamber. The orientation of the tether is selected so that, on inflation of the air-bag, the air-bag effects an appropriate forward movement so that the air-bag may be positioned adjacent the side of a seat occupant to provide an appropriate degree of protection in an accident situation. Additionally, the internal tether serves the function of preventing excessive movement of part of the air-bag away from the point where the air-bag is initially mounted in position, thus helping ensure that the air-bag, when inflated, has a substantial thickness.

Referring initially to FIGS. 1 to 3 of the accompanying drawings, a side air-bag A is illustrated, the side air-bag A being formed from two substantially identical layers of fabric 1, 2. The layers of fabric may be two totally separate layers of fabric but, as shown, are regions of a single layer of fabric cut to a substantially "butterfly" shape and folded about a fold-line 3 so as to overlie each other. The super-imposed layers of fabric 1, 2 are interconnected by means of a peripheral seam 4 which, together with the fold-line 3, effectively seals the two layers of fabric together to form the inflatable air-bag A. A gas generator 5 is provided located in position within the air-bag adjacent the fold-line 3. The side air-bag A as thus far described is conventional.

Contained within the side air-bag A is an internal tether 6. The tether 6, in this embodiment, is a panel of fabric, the panel of fabric having a width in excess of one-half of the total height of the air-bag. The width of the fabric is thus in excess of 50 mm. However, in alternative embodiments, the internal tether could be constituted by a plurality of straps which may be parallel with each other, acting in concert, the distance between the top of the uppermost strap and the bottom of the lowermost strap being in excess of 50 mm.

In the illustrated embodiment of the invention the internal tether 6 is secured to the two identical layers of fabric 1, 2 in the region of the fold-line 3. The internal tether is also connected, by means of stitching 7, to one layer of fabric of the panel 2 at a point which is spaced away from the fold-line 3 at a point which is relatively close to (but still spaced from) the peripheral seam 4. The stitching 7 is at a point within the inflatable region of the air-bag A which is remote. Thus, when considering the air-bag A in horizontal section, the distance around the periphery of the air-bag A from the fold-line 3, as connected to one end of the tether 6 and the stitching 7 connecting the other end of the tether to the air-bag A is greater in one direction, namely the clockwise direction, than the other direction, namely the anti-clockwise direction. Also, the length of the internal tether 6, that is to say the distance between that part of the tether which is connected to the fold-line 3 and that part of the tether 6 which is connected to the fabric 2 by the stitching 7, is less than the shorter distance around the periphery of the air-bag A from the fold-line 3 to the stitching 7, that is to say the distance around the periphery in the anti-clockwise direction.

The tether 6 can be considered to divide the air-bag A into two adjacent notional chambers. One chamber is of greater volume than the other chamber.

It is to be appreciated that the air-bag A is to be mounted in the side part of a back-rest 10 of a vehicle seat which is located adjacent to one side 11 of the vehicle.

The air-bag A will be inflated, in a conventional manner, in the event that an accident should arise. On inflation of the air-bag A gas from the gas generator will fill the volume between the two super-imposed layers 1 and 2. The effect of the tether 6, and the two notional chambers will be to tend to pull the air-bag A, as it inflates, so that the air-bag A will extend forwardly adjacent the side of the vehicle as shown in FIG. 3. Since the length of the tether 6 between the fold 3 and the stitching 7 is less than the shorter length of the fabric 2 about the periphery of the bag between the fold 3 and the stitching 7, the action of the tether 6 will prevent the line of stitching 7 from moving as far away from the gas generator as it would if the tether 6 were not present. Thus the effect of the tether 6 will be to cause the air-bag A, when inflated, to have a bulbous form, as shown in FIG. 3, providing a substantial thickness of air-bag A between the seat occupant and the adjacent side of the vehicle.

Whilst the invention has been described with reference to one embodiment of FIG. 2 in which the tether extends from the fold 3 to a line of stitching 7 relatively close to the peripheral seam 4, as shown in FIG. 4, which illustrates a modified embodiment of the invention, the tether 6 may extend from the peripheral seam 4 to a line of stitching 7 which is located adjacent, but still spaced from, the fold 3. Again the tether is located so that when the horizontal section of the air-bag is considered, the distance around the periphery of the air-bag A between the points where the tether 6 is connected to the air-bag A is greater in one direction than the other direction. Also the tether 6 is shorter than the said distance in the other direction, that is to say the shorter distance. The action of the tether will be effectively as described above.

Figure 5:
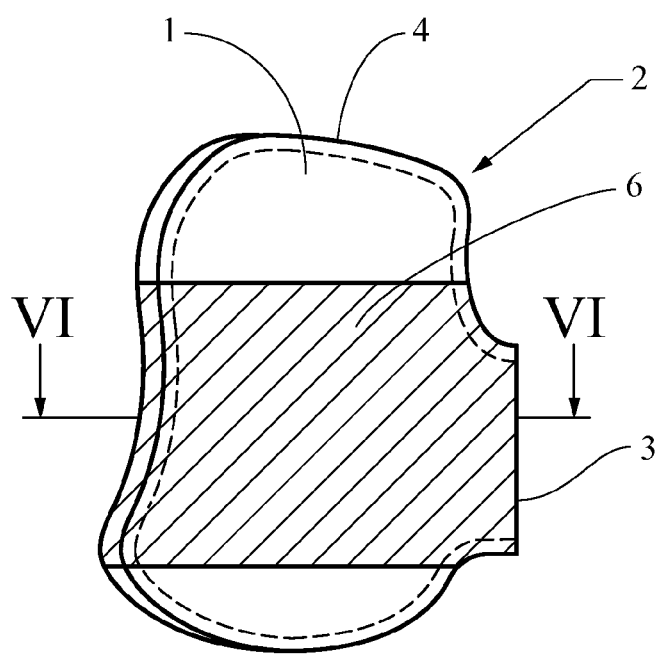
FIG. 5 is a view corresponding to FIG. 1 showing a further embodiment of the invention.
Figure 6:
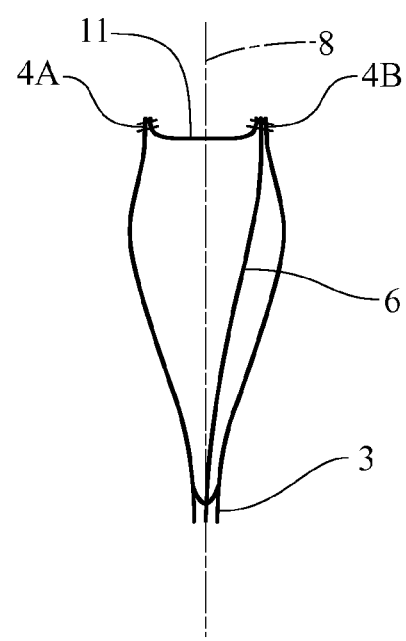
FIG. 6 is a horizontal sectional view taken on the line VI-VI of FIG. 5 showing the air-bag partially inflated.

FIGS. 5 and 6 illustrate a further modified embodiment of the invention in which a gusset or third layer of fabric 11 is provided over at least part of the length of the peripheral seam 4 which interconnects two layers of fabric 1, 2 of the type described above with reference to FIGS. 1 and 2. The third layer of fabric or gusset 11 will make the air-bag B a "three dimensional" air-bag B. In this embodiment the internal tether 6 extends from the fold-line 3 to one edge of the gusset 11, as can be seen in FIG. 6. Also as can be seen in FIG. 6 in the region of the gusset 11 the peripheral seam 4 has two seam portions 4A and 4B, one seam portion being located to each side of the gusset 11. Again it can be seen that the distance around the periphery of the air-bag B between the ends of the tether in one direction than the other with the tether having a length which is less than the shorter of the distances.

Figure 7:
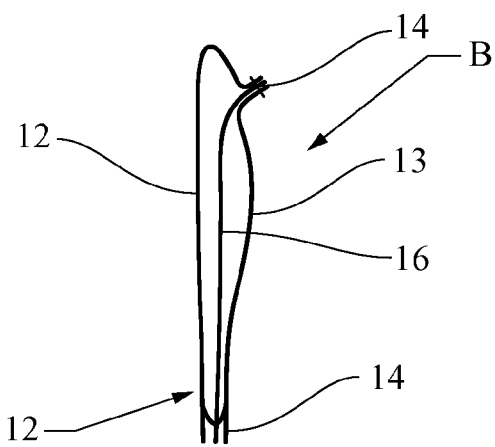
FIG. 7 is a horizontal sectional view corresponding to FIG. 2 showing yet another embodiment of the invention in horizontal section in an uninflated.
Figure 8:
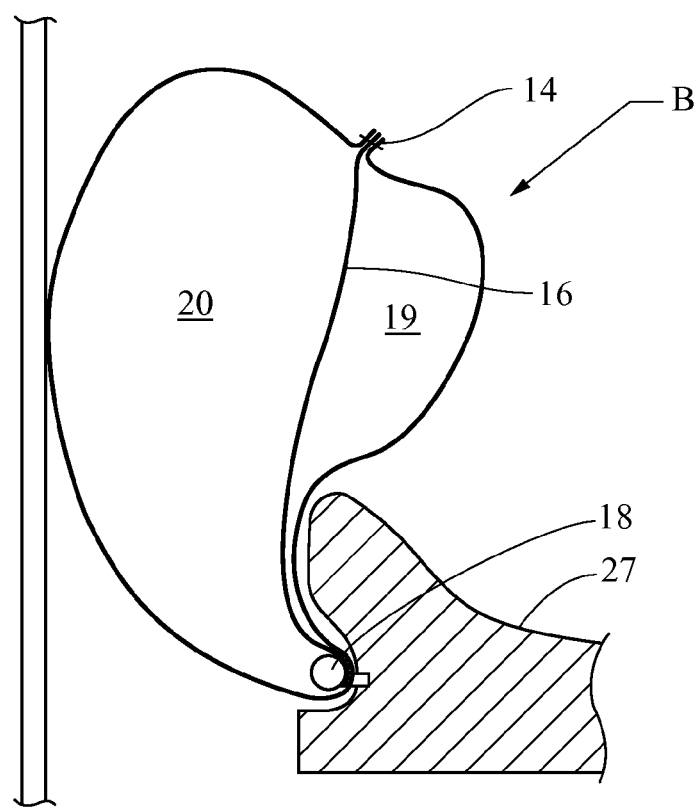
FIG. 8 is a view showing the air-bag of FIG. 7, in a horizontal section, when inflated and when mounted on part of a motor vehicle seat.

Turning now to FIGS. 7 and 8, yet a further embodiment of the invention is illustrated. In FIGS. 7 and 8 the air-bag B of this embodiment is shown in horizontal section. The air-bag B is formed from two layers of fabric 12, 13 interconnected by means of a peripheral seam 14. In this embodiment the peripheral seam 14 extends all the way round the air-bag B, including a region 15 to receive a gas generator. One layer of fabric 12 is greater size than the other layer of fabric 13. An internal tether 16 is provided, which extends from the region 15 to the peripheral seam 14. Because the layer of fabric 12 has a greater size than the layer of fabric 13, the distance from the end of the tether 16 in the region 15 to receive the gas generator to the seam 14 is greater in the clockwise direction than in the anti-clockwise direction. The tether 16 is itself shorter than the length of the periphery of the air-bag from the region to receive the gas generator to the peripheral seam 14 as measured in the anti-clockwise direction in the section shown in FIG. 7.

The air-bag B of FIG. 7 is to be mounted in an edge part of the vehicle seat 17 as shown in FIG. 8, with a gas generator 18 mounted in position within the air-bag B. On inflation of the air-bag B, the internal tether 16 serves to divide the interior of the air-bag B into two notional chambers 19, 20. The chamber 19, which is bounded by the tether 16 and the part of the periphery of the air-bag B between the ends of the tethers which is of lesser length has a lesser volume than the chamber 20 which is bounded by the tether 16 and the part of the outer periphery of the air-bag between the ends of the tether of greater length. The action of the tether, which defines the two chambers, is such that on inflation of the air-bag B, the air-bag B moves forwardly from the back rest of the seat. The tether prevents the peripheral seam 14 moving more on the predetermined distance away from the gas generator 18, thus helping ensure that the air-bag B has a substantial thickness when in position, so that the air-bag B provides a good degree of protection for a seat occupant.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A side air-bag adapted to be mounted to a vehicle seat back and formed of interconnected layers of fabric, the air-bag further adapted to be inflated by a gas generator, the air-bag comprising: an internal tether having first and second ends fastened to one or more of the fabric layers and serving to interconnect two spaced-apart regions of an interior of the air-bag, wherein, upon inflation of the air-bag, the distance around the periphery of the air-bag, in horizontal section, between the ends of the tether is greater in one direction than in the other direction and the length of the tether is less than the distance in the other direction;
    the air-bag includes a portion configured to receive a gas generator, the first end fastened at a point at or adjacent to the portion configured to receive the gas generator, the tether extending to the second end fastened to a point within the interior of the air-bag which is remote from the gas generator, where upon inflation, the tether divides the air-bag interior into two chambers positioned between an occupant of the seat and a side of the vehicle.

2. The side air-bag according to claim 1 wherein the tether has an overall vertical extent of at least 50 mm.

3. The air-bag according to claim 1 wherein the interconnected layers of fabric comprise: two super-imposed layers of fabric having substantially identical sizes interconnected by a peripheral seam and a gusset or third layer of fabric interposed between the two layers of fabric over at least part of the peripheral seam, the tether extending from the portion configured to receive the gas generator to a side edge part of the gusset.

4. The air-bag according to claim 1 wherein the tether is a single panel.

5. The air-bag according to claim 1 wherein the tether is a plurality of straps acting together.

6. A side air-bag adapted to be mounted to a vehicle seat back and formed of interconnected layers of fabric the air-bag further adapted to be inflated by a gas generator, the air-bag comprising: an internal tether having first and second ends fastened to one or more of the fabric layers and serving to interconnect two spaced-apart regions of an interior of the air-bag, wherein upon inflation of the air-bag, the distance around the periphery of an interior of the air-bag, in horizontal section, between the ends of the tether is greater in one direction than in the other direction and the length of the tether is less than the distance in the other direction, the air-bag includes a portion configured to receive a gas generator and extending to the second end fastened to a point within the interior of the air-bag which is remote from the gas generator, where upon inflation, the tether divides the air-bag interior into two chambers positioned between an occupant of the seat and a side of the vehicle,
    wherein the interconnected layers of fabric comprise two super-imposed layers of fabric having substantially identical sizes, the layers of fabric being interconnected by a peripheral seam, the tether extending from the portion configured to receive the gas generator to a part of one of the layers of fabric spaced from the peripheral seam.

7. The side air-bag according to claim 6 wherein the tether has an overall vertical extent of at least 50 mm.

8. The air-bag according to claim 6 wherein the tether is a single panel.

9. The air-bag according to claim 6 wherein the tether is a plurality of straps acting together.

10. The air-bag according to claim 6 wherein the interconnected layers of fabric further comprise a gusset or third layer of fabric interposed between the two layers of fabric over at least part of the peripheral seam, the tether extending from the portion configured to receive the gas generator to a side edge part of the gusset.

11. A side air-bag adapted to be mounted to a vehicle seat back and formed of interconnected layers of fabric, the air-bag further adapted to be inflated by a gas generator, the air-bag comprising: an internal tether having first and second ends fastened to one or more of the fabric layers and serving to interconnect two-spaced-apart regions of an interior of the air-bag, wherein upon inflation of the air-bag, the distance around the periphery of the air-bag, in horizontal section, between the ends of the tether is greater in one direction than in the other direction and the length of the tether is less than the distance in the other direction, the air-bag includes a portion configured to receive a gas generator, the tether first end fastened at a point at or adjacent the portion configured to receive the gas generator and extending to the second end fastened to a point within the interior of the airbag which is remote from the gas generator, wherein upon inflation, the tether divides the air-bag interior into two chambers positioned between an occupant of the seat and a side of the vehicle and the interconnected layers of fabric are two adjacent layers of fabric of different sizes interconnected by a peripheral seam, the internal tether extending from the portion configured to receive the gas generator to part of the peripheral seam.

12. The air-bag according to claim 11 wherein the tether is a single panel.

13. The air-bag according to claim 11 wherein the tether is a plurality of straps acting together.

14. The air-bag of claim 11 wherein the interconnected layers of fabric comprise: two super-imposed layers of fabric having substantially identical sizes interconnected by a peripheral seam and a gusset or third layer of fabric interposed between the two layers of fabric over at least part of the peripheral seam, the tether extending from the portion configured to receive the gas generator to a side edge part of the gusset.

15. An air-bag of claim 11 wherein the tether has an overall vertical extent of at least 50 mm.

* * * * *